United States Patent
Armstrong et al.

(10) Patent No.: US 8,385,356 B2
(45) Date of Patent: Feb. 26, 2013

(54) DATA FRAME FORWARDING USING A MULTITIERED DISTRIBUTED VIRTUAL BRIDGE HIERARCHY

(75) Inventors: William J. Armstrong, Rochester, MN (US); Claude Basso, Raleigh, NC (US); David R. Engebretsen, Cannon Falls, MN (US); Kyle A. Lucke, Oronoco, MN (US); Jeffrey J. Lynch, Apex, NC (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/751,187

(22) Filed: Mar. 31, 2010

(65) Prior Publication Data

US 2011/0243146 A1 Oct. 6, 2011

(51) Int. Cl.
*H04L 12/28* (2006.01)
(52) U.S. Cl. .................. 370/401; 370/392; 370/465
(58) Field of Classification Search ............... None
See application file for complete search history.

(56) References Cited

U.S. PATENT DOCUMENTS

| | | | | |
|---|---|---|---|---|
| 7,281,039 B1* | 10/2007 | Salkewicz | ............... | 709/223 |
| 7,831,759 B2* | 11/2010 | Boyd et al. | ............... | 710/316 |
| 8,054,832 B1* | 11/2011 | Shukla et al. | ............... | 370/389 |
| 8,271,680 B2* | 9/2012 | Salkewicz | ............... | 709/238 |
| 2004/0037279 A1* | 2/2004 | Zelig et al. | ............... | 370/390 |
| 2007/0067432 A1* | 3/2007 | Tarui et al. | ............... | 709/223 |
| 2007/0260910 A1 | 11/2007 | Jain et al. | | |
| 2007/0299987 A1 | 12/2007 | Parker et al. | | |
| 2010/0036995 A1* | 2/2010 | Nakayama et al. | ............ | 710/316 |
| 2010/0067374 A1* | 3/2010 | Elangovan et al. | ............ | 370/230 |
| 2010/0107162 A1* | 4/2010 | Edwards et al. | ............ | 718/1 |
| 2010/0257263 A1* | 10/2010 | Casado et al. | ............ | 709/223 |
| 2010/0257269 A1* | 10/2010 | Clark | ............ | 709/226 |
| 2011/0061094 A1* | 3/2011 | Salkewicz | ............ | 726/4 |
| 2011/0069710 A1* | 3/2011 | Naven et al. | ............ | 370/395.3 |
| 2011/0153715 A1* | 6/2011 | Oshins et al. | ............ | 709/203 |
| 2011/0243134 A1* | 10/2011 | Armstrong et al. | ............ | 370/392 |
| 2011/0264610 A1* | 10/2011 | Armstrong et al. | ............ | 706/12 |
| 2012/0027014 A1* | 2/2012 | Mack-Crane et al. | ............ | 370/390 |
| 2012/0036236 A1* | 2/2012 | Richardson et al. | ............ | 709/220 |
| 2012/0209940 A1* | 8/2012 | Kidambi et al. | ............ | 709/212 |

OTHER PUBLICATIONS

IBM Patent Application entitled "Data Frame Forwarding Using a Distributed Virtual Bridge," filed Mar. 31, 2010 by William J. Armstrong et al.

* cited by examiner

*Primary Examiner* — Michael J Moore, Jr.
(74) *Attorney, Agent, or Firm* — Toler Law Group (57) ABSTRACT

Systems and methods to forward data frames are provided. A particular method may include evaluating address data of a first data frame at a first virtual bridge coupled to a first virtual machine of a first server computer of a plurality of server computers. Based upon the evaluation at the first virtual bridge, the first data frame may be forwarded to a second virtual bridge associated with an adapter that is coupled to the first virtual machine. The address data of the first data frame may be evaluated at the second virtual bridge. Based upon the evaluation, the data frame may be forwarded to a third virtual bridge configured to forward the data frame based upon the address data to a second server computer of the plurality of server computers.

25 Claims, 5 Drawing Sheets

DATA FRAME FORWARDING USING A MULTITIERED DISTRIBUTED VIRTUAL BRIDGE HIERARCHY

FIELD OF THE DISCLOSURE

The present disclosure relates generally to data communications, and more specifically, to data frame forwarding between blade server computers.

BACKGROUND

Server computers may compete for access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

Figure 1:
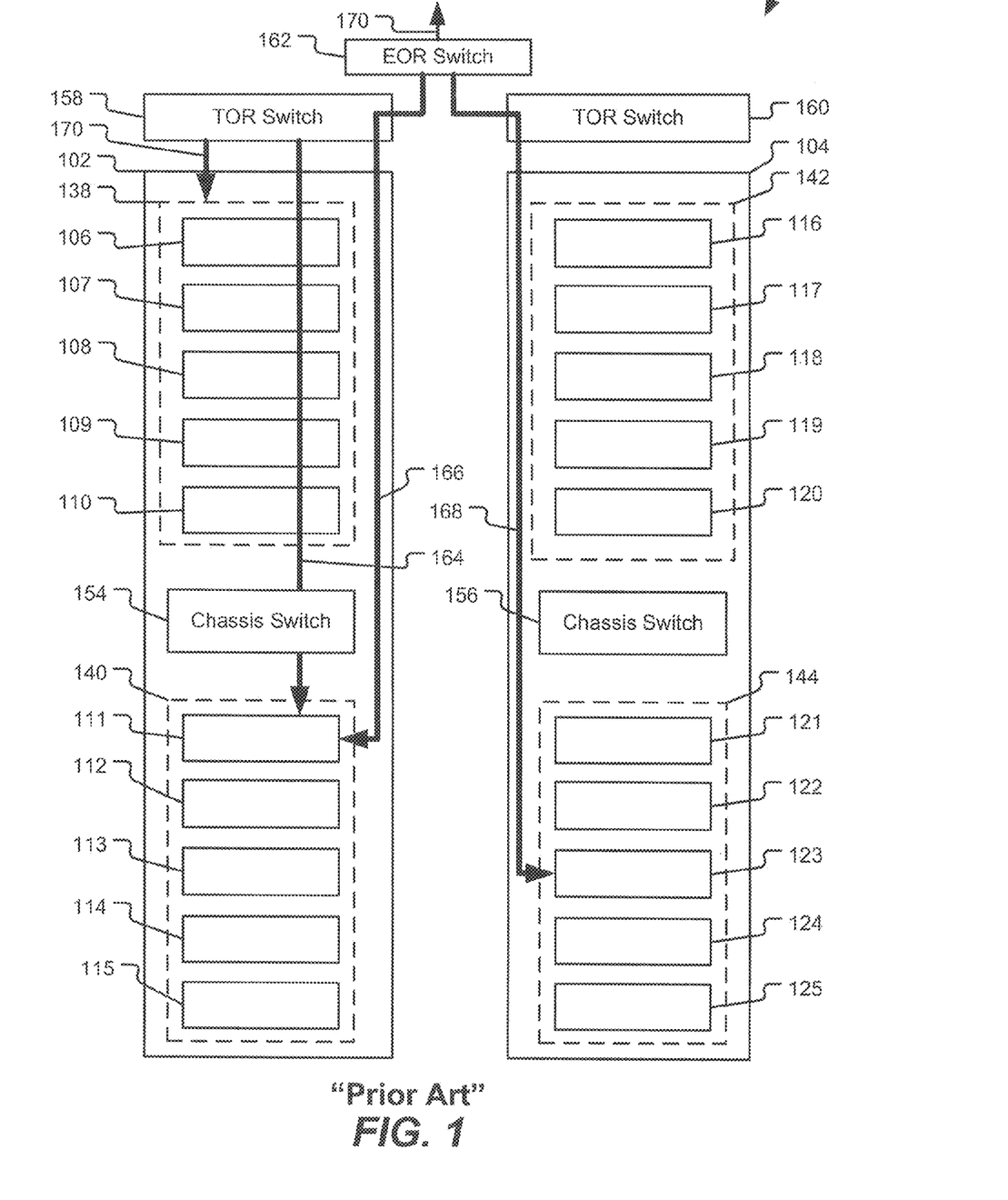
FIG. 1 is a block diagram of a prior art computing system that includes racks of blade server computers.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology enclosure (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158, an end of rack switch (EOR) 162, and a top of rack switch 160. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

Increasing the number of switches and associated connections to accommodate additional traffic may present configuration challenges and complexities, as well as increase hardware costs and latency. It is therefore desirable to increase the efficiency with which data frames may be forwarded between server computers.

SUMMARY OF THE DISCLOSURE

In a particular embodiment, an apparatus for forwarding data frames is disclosed. The apparatus includes a first virtual bridge coupled to a first virtual machine of a first server computer of a plurality of server computers. The first virtual bridge is configured to forward a first data frame. The apparatus further includes a second virtual bridge associated with an adapter coupled to the first virtual machine. The second virtual bridge is configured to receive the first data frame from the first virtual bridge. A third virtual bridge is coupled to the adapter and to the plurality of server computers. The third virtual bridge is configured to receive the first data frame from the second virtual bridge and to forward the first data frame to a second server computer of the plurality of server computers.

In another embodiment, an apparatus is disclosed that includes a first tier virtual bridge coupled to a first plurality of computing nodes. The first tier virtual bridge stores first address data used to forward a first data frame between the first plurality of computing nodes. A second tier virtual bridge is coupled to the first tier virtual bridge and to a second plurality of computing nodes. The second tier virtual bridge stores second address data used to forward a second data frame between the second plurality of computing nodes. A third tier virtual bridge is coupled to the second virtual bridge and to a third plurality of computing nodes. The third tier virtual bridge stores third address data used to forward a third data frame between the third plurality of computing nodes. A tier supervisor module including an interface is configured to set an operating parameter of at least two of: the first tier virtual bridge, the second tier virtual bridge, and the third tier virtual bridge.

In another embodiment, a method of forwarding a data frame is disclosed. The method includes evaluating address data of a first data frame at a first virtual bridge coupled to a first virtual machine of a first server computer of a plurality of server computers. Based upon the evaluation at the first virtual bridge, the first data frame may be forwarded to a second virtual bridge associated with an adapter coupled to the first virtual machine. The address data of the first data frame may be evaluated at the second virtual bridge. Based upon the evaluation at the second virtual bridge, the first data frame may be forwarded to a third virtual bridge. The third virtual bridge may be configured to forward the first data frame based upon the address data to a second server computer of the plurality of server computers.

In another embodiment, a program product includes program code resident within a memory and configured to be executed by a processor to forward a data frame. Address data of a first data frame may be evaluated at a first virtual bridge coupled to a first virtual machine of a first server computer of a plurality of server computers, and based upon the evaluation at the first virtual bridge, first data frame may be forwarded to a second virtual bridge associated with an adapter coupled to the first virtual machine. The address data of the first data frame may be evaluated and the data frame may be forwarded to a third virtual bridge configured to forward the data frame based upon the address data to a second server computer of the plurality of server computers. The program product further includes a computer readable medium bearing the program code.

An embodiment may facilitate lossless, point-to-point, in-order data frame delivery between tiers of a hierarchy of virtual bridges. Functions, such as those storing address data and performing security operations, may be distributed to decrease redundancy and increase efficiency. Cost and space demands may be reduced, and an embodiment of a system may be scalable to include hundreds or more server computers with direct connectivity.

Features that characterize embodiments of the invention are set forth in the claims annexed hereto and forming a further part hereof. However, for a better understanding of embodiments of the invention, and of the advantages and objectives attained through its use, reference should be made to the Drawings and to the accompanying descriptive matter in which there are described exemplary embodiments of the invention.

DETAILED DESCRIPTION

Data frame communication may be improved by providing a hierarchy of virtual bridges that reduces traversals of the tiers of the hierarchy. The tasks of each tier may be distributed in such a manner as to reduce redundancy and routing processes. For example, a virtual bridge may intercept and directly route data frames addressed to virtual machines coupled to the virtual bridge (e.g., within the domain of the virtual bridge) without first routing the data frames through another tier. In another example, a security operation performed upon a data frame at an upper tier of the hierarchy may not need to be repeated as the data frame is forwarded through other tiers. A tier supervisor module may be configured to access the processes of each tier of the virtual bridge hierarchy. The tier supervisor module may provide a consistent interface for each of the tiers and may reduce the redundant entry of operating parameters at each virtual bridge, such as security and routing configuration information. For example, the interface may allow a user to specify a type of security operation or update one or more elements of address data associated with each virtual bridge.

More particularly, a virtual bridge of a hypervisor may comprise a top layer, or tier, of a hierarchy of virtual bridges. A layer that includes a virtual bridge associated with an adapter may comprise the second tier of the hierarchy. The first and second tier virtual bridges may each include a lookup table having address data. A distributed virtual bridge may be included within a third tier of the hierarchy. The distributed virtual bridge may be associated with a distributed switch that includes multiple bridge elements. Each bridge element may include a forwarding cache. The virtual bridges of the hierarchy may include one or more virtual Ethernet bridges.

A virtual bridge at each tier may be configured to recognize a data flow included within its domain. The virtual bridge may route a data frame directed within the domain directly to a destination node without first sending the data frame to another tier. For example, the virtual bridge of the hypervisor may recognize that a data frame is to be forwarded to a neighboring virtual machine (e.g., also coupled to the virtual bridge of the hypervisor). The virtual bridge may store or have access to address data (e.g., media access control (MAC) addresses) used to identify the destination of the data frame. For instance, the virtual bridge may include a lookup table having address information used to match and route corresponding address data included within the data frame. The virtual bridge may intercept and directly forward the data frame to the virtual machine without having to send the data frame to the second tier.

Because the virtual bridge includes the address data and may use it autonomously, the address data may not be stored at a lower level tier (e.g., the second tier). This feature may reduce redundant storage and processing of the address data. The direct routing of the data frame may also reduce processing demands and execution times.

Similarly, the virtual bridge of the adapter may include address data pertaining to virtual machines that are coupled to its virtual ports. This address information may not be maintained within the downstream, third tier virtual bridge to reduce memory and processing requirements. When a data frame received at a port of the second tier virtual bridge designates a destination address of a virtual machine or other computing component that is coupled to another virtual port of the virtual bridge, the data frame may be forwarded directly to the virtual machine without being further routed through the third tier virtual bridge.

The third tier virtual bridge may include one or more bridge elements. The bridge elements may each include a forwarding cache used to route received data frames between the distributed elements. The bridge elements may also access address data maintained at a controlling bridge. For example, a bridge element may evaluate a forwarding cache for address data. If the address data is absent from the forwarding cache, the bridge element may send a message to a controlling bridge. The controlling bridge may communicate the address data through other bridge elements to the requesting bridge element. The requesting bridge element may learn, or store, the address data within its forwarding cache.

Security operations may be selectively positioned within the hierarchy of virtual bridges to reduce redundancy. For example, a security operation that verifies that the address data of a received data frame is within a range of predetermined addresses may be performed at a port of the second tier virtual bridge. As such, the port may include an access control list. Another example of a security operation at a virtual bridge port may verify that the Ether type of a received frame is a predetermined type. The Ether type of the data frame may indicate a protocol of the payload. For example, the port of the second tier virtual bridge may filter out data frames having any Ether type other than Fiber Channel over Ethernet (FCoE). Such configuration parameters relating to the security settings may be set via a user interface of the tier supervisor module.

Figure 2:
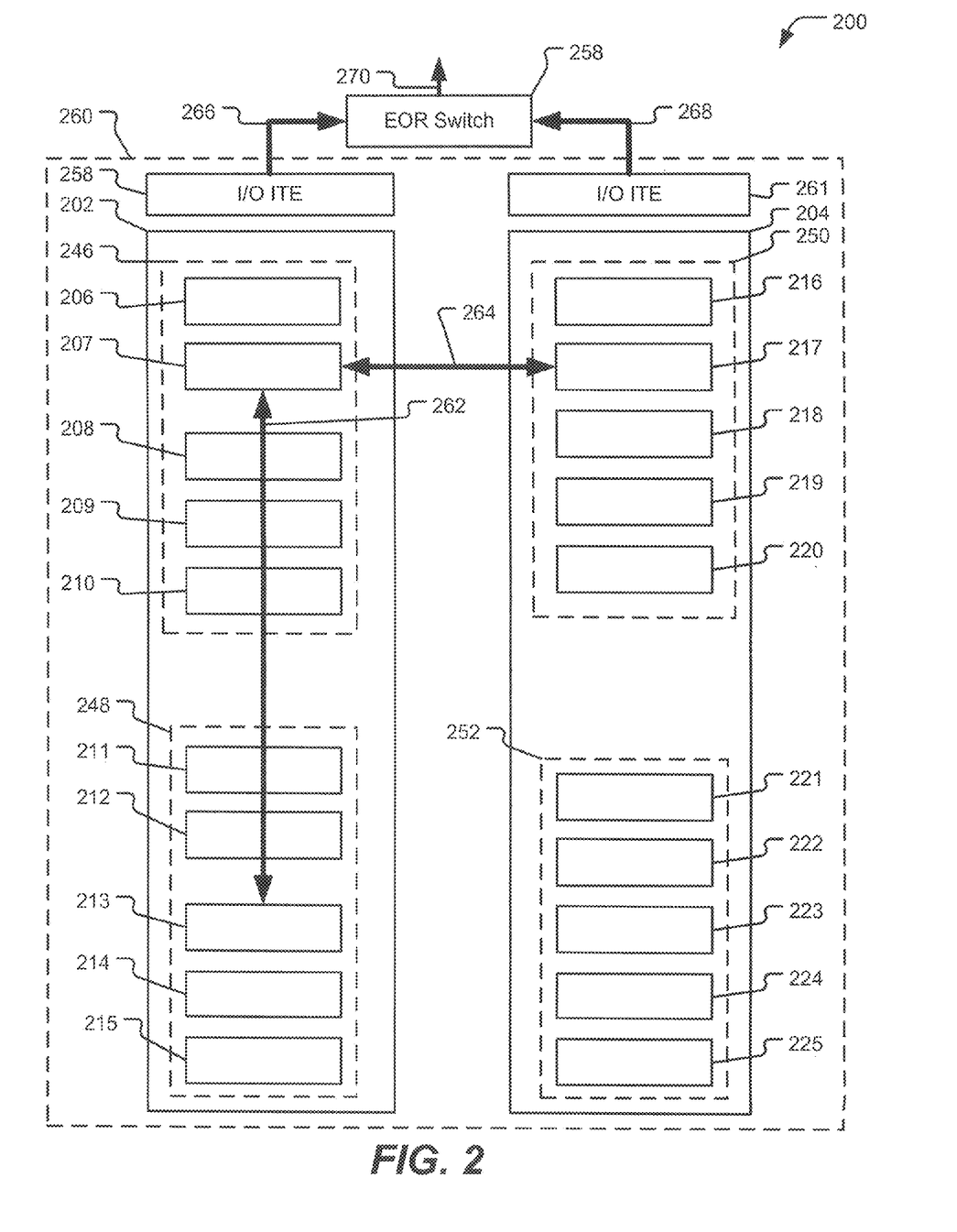
FIG. 2 is a block diagram of an embodiment of a networked computing system configured to allow direct communication between server computers housed within different racks and chassis of blade server computers.

Turning particularly to the drawings, FIG. 2 shows an illustrative embodiment of a system 200 configured to forward data frames using a hierarchy of tiered virtual bridges. A tiered virtual bridge hierarchy 260 may extend across server computers 206-225, chassis 246, 248, 250, 252, and racks 202, 204 to provide a multilayer hierarchy with data link layer (i.e., Layer 2) switching between the virtual bridges. The virtual bridges may provide a frame-based, Ethernet-like interface. The interface may facilitate lossless, point-to-point, in-order frame delivery between server computers 206-225 of different racks 202, 204 or chassis 246, 248, 250, 252 (i.e., east-west connectivity) without reduced routing traversals and redundancies.

The system 200 further includes an end-of-rack switch 258 and input/output (I/O) server ITEs 258, 261 that enable north-south connectivity. The I/O server ITEs 254, 256 may enable uplink connectivity to the external Ethernet network (or other network) for the server computers 206-225 housed within the racks 204, 206.

An arrow 264 of FIG. 2 represents direct east-west connectivity and the flow of data frames between server computers located in different racks 202, 204 of the system 200 (e.g., without using a top of rack or chassis switch). An arrow 262 represents direct east-west connectivity across different chassis 246, 248 of the rack 202.

The system 200 of FIG. 2 may thus enable direct connectivity between server computers of different racks or chassis without using a chassis or a top of rack switch. The direct connectivity may streamline the routing of data frames. The tiered virtual bridge hierarchy 260 may further reduce contention for resources and increase data frame traffic flow.

Figure 3:
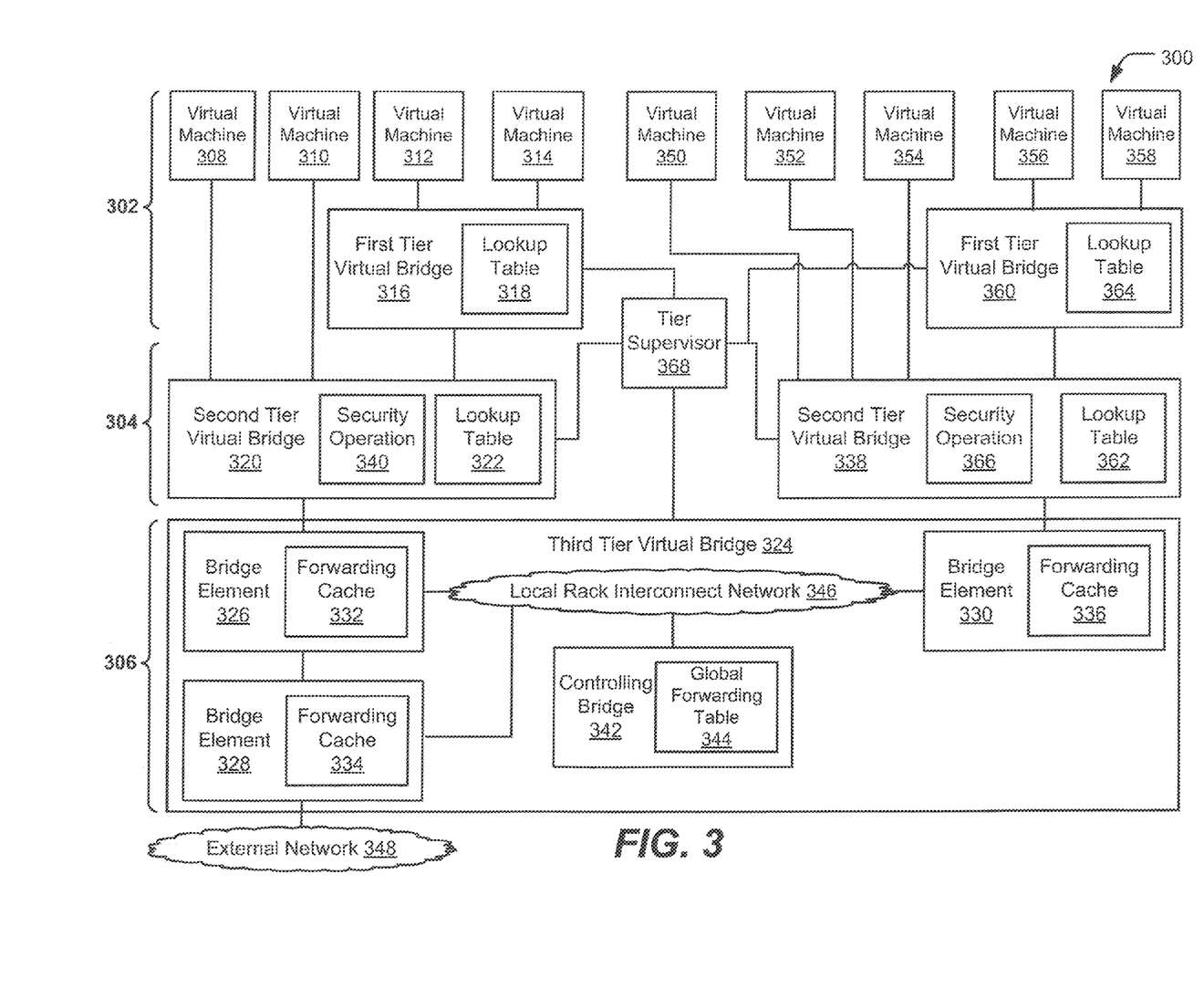
FIG. 3 is a block diagram of a particular embodiment of a system configured to forward data frames using a hierarchy of tiered virtual bridges.

FIG. 3 shows a particular illustrative embodiment of a hierarchical tiered system 300 that includes multiple tiers 302, 304, and 306 of virtual bridges 316, 320, 324, 338, and 360. Certain routing and security functions of the virtual bridges 316, 320, 324, 338, and 360 may be distributed across the tiers 302, 304, and 306 to streamline processing and increase efficiency.

The system 300 may include a first tier virtual bridge 316 coupled to one or more virtual machines 312, 314. The first tier bridge 316 may comprise a virtual bridge of a hypervisor. The first tier virtual bridge 316 may be configured to identify a data flow included within its domain (e.g. the virtual machines 312, 314 coupled to the virtual bridge 316). The first tier virtual bridge 316 may directly route a data frame addressed to a destination node within its domain without first sending the data frame to another tier. For example, the first tier virtual bridge 316 may identify that a data frame received from the virtual machine 312 is addressed to the virtual machine 314, which is also coupled to the first tier virtual bridge 316.

The first tier virtual bridge 316 may store or have access to address data (e.g., MAC addresses) used to identify the destination of the data frame. For instance, the first tier virtual bridge 316 may include a lookup table 318 having address data used to match and route corresponding address data included within the data frame. More particularly, address data, or forwarding/routing information, contained in the frame header may be used as a key to search the bridge elements of the first tier virtual bridge. If an entry is present that matches the key, address data comprising forwarding/routing information may be taken from the table and used to route the data frame.

The first tier virtual bridge 316 may intercept and directly forward the data frame to the virtual machine 314 without having to send the data frame down to the second tier 304. The first tier virtual bridge 316 may further send a message informing the virtual machine 312 that the data frame was forwarded.

Because the first tier virtual bridge 316 both stores and uses the address data, the address data may not be stored at a lower level tier (e.g., the second tier 304). This feature may reduce redundant storage and processing of the address data. The direct routing of the data frame by the first tier virtual bridge 316 may also reduce processing demands and execution times.

The second tier 304 of the system 300 may include a second tier virtual bridge 320. The second tier virtual bridge 320 may be associated with an adapter 338. The second tier virtual bridge 320 may include a lookup table 322 having address data associated with virtual machines 308, 310 that are coupled to ports of the second tier virtual bridge 320. This address data may not be maintained within a downstream, bridge element 326 of a third tier virtual bridge 324 to reduce memory and processing demands.

The second tier virtual bridge 320 may recognize that a data frame received at a first port of the second tier virtual bridge 320 designates a destination address of the virtual machine 310. The second tier virtual bridge 320 may forward the data frame directly to the virtual machine 310 without further routing it through the third tier 306.

Security operations may be streamlined by selectively arranging one or more security operations at a highest or otherwise most effective level of the hierarchy of virtual bridges. While such security operations may occur at any or all of the tiers 302, 304, and 306, an illustrative security operation module 340 is shown in FIG. 3 at the second tier virtual bridge 320. The security operation module 340 may verify that the address data of a data frame received at a port of the second tier virtual bridge 320 is within a range of predetermined addresses. As such, an embodiment of the security operation module 340 may include an access control list.

Another example of a security operation at the security operation module 340 may verify that the Ether type of a received frame is a predetermined type. For example, the security operation module 340 may filter out data frames having any Ether type other than FCoE.

A third tier virtual bridge 324, or distributed virtual bridge, may comprise the third tier 306 of the system 300. The third tier virtual bridge 324 may include multiple bridge elements 326, 328, and 330. Each bridge element 326, 328, and 330 may comprise a distinct third tier virtual bridge functioning in aggregate as a larger third tier virtual bridge 324.

The bridge elements 326, 328, and 330 may each include a forwarding cache 332, 334, and 336 used to route received data frames between the bridge elements 326, 328, and 330. The bridge elements 326, 328, and 330 may also access address data maintained at a controlling bridge 342. For example, a bridge element 326 of the tier 306 may evaluate a forwarding cache 332 for address data. If the address data is absent from the forwarding cache 332, the bridge element 326 may send a message to the controlling bridge 342. The controlling bridge 342 may attempt to locate the address data within a global forwarding table 344. The address data may be communicated through other bridge elements (e.g., the bridge element 328) and a local rack interconnect network 346 to the requesting bridge element 326. The bridge element 326 may learn, or store, at least a portion of the address data within its forwarding cache 332. When the address data is not located, the third tier virtual bridge 324 may flood by sending the data frame to all nodes in communication with the local rack interconnect network 346 and out an uplink port to an Ethernet or other external network 348.

The system 300 may similarly function to efficiently forward frames sent from the third tier 306 to the upper tiers 302, 304. For example, the bridge element 330 of the third tier 306 may forward a data frame to a second tier virtual bridge 338 of the second tier 304. The second tier virtual bridge 338 may evaluate a destination address of the received data frame against address data stored within a lookup table 362. If the destination of the data frame is located within the domain of the second tier virtual bridge 338 (e.g., corresponding to virtual machines 350, 352, and 354), the data frame may be forwarded without first being sent to the first tier virtual bridge 360. In such a scenario, the first tier virtual bridge 360 may not store the address data associated with the domain of the second tier virtual bridge 338. The second tier virtual bridge 338 may additionally perform a security operation on the received data frame using a security operation module 366.

When an evaluation of the address data indicates that the destination of the data frame is not located within the domain of the second tier virtual bridge 338, the data frame may be forwarded to the first tier virtual bridge 360. The first tier virtual bridge 360 may access a lookup table 364 to route the data frame to a destination virtual machine 356.

A tier supervisor module 368 may be configured to access the processes of each tier 302, 304, and 306 of the system 300. The tier supervisor module 368 may provide a user interface to each of the tiers 302, 304, and 306 and may reduce redundant operating parameters, such as security and routing configuration information. For example, the tier supervisor module 368 may allow a user to specify a type of security operation or to update a range of address data associated with one or more of the virtual bridges 316, 320, 324, 338, and 360.

FIG. 3 thus shows a hierarchical tiered system 300 having virtual bridges that may be tiered for efficiency and cost considerations. Functions of the virtual bridges may be distributed among the tiers to reduce redundant processing and space demands.

Figure 4:
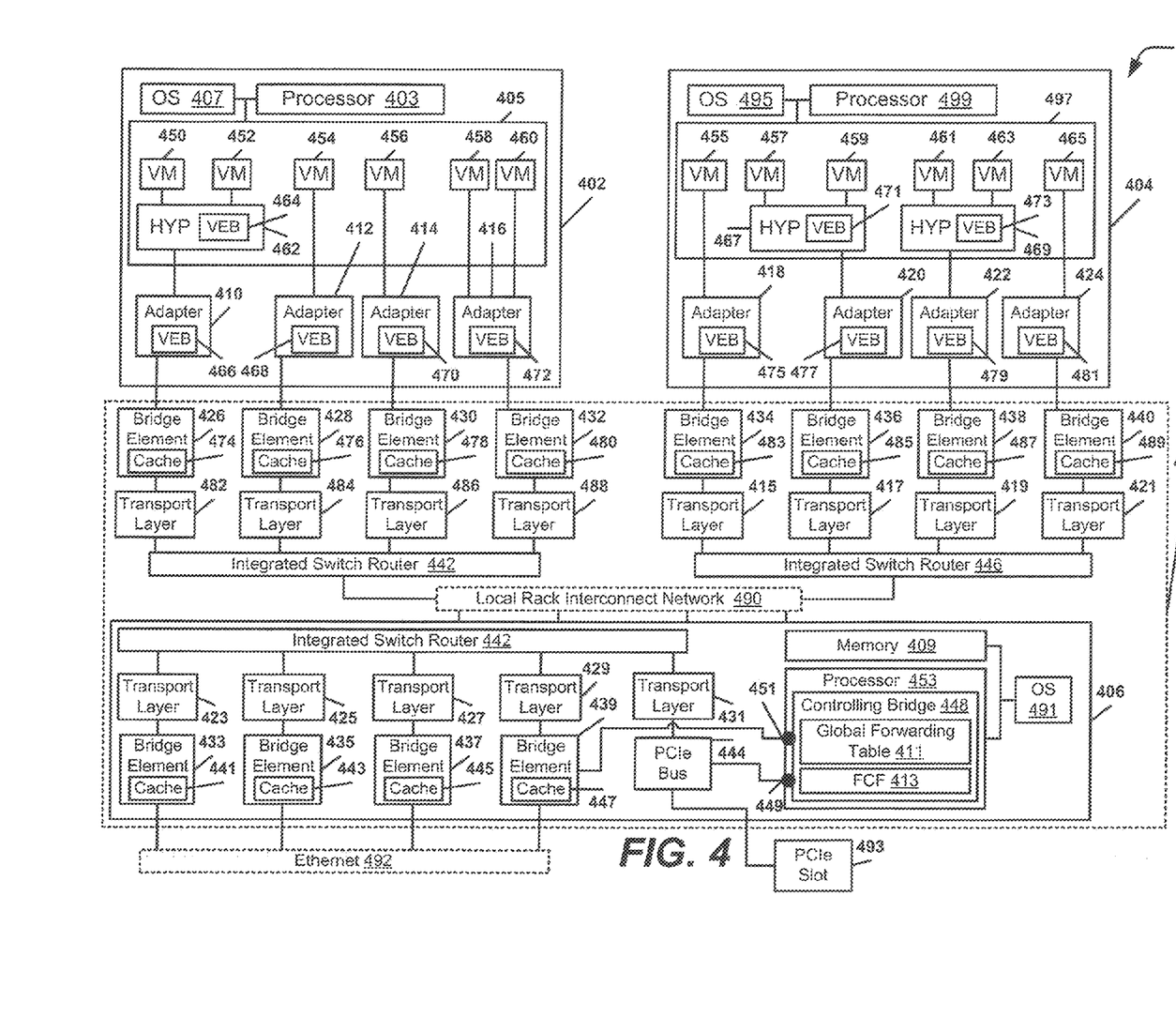
FIG. 4 is a block diagram of another particular embodiment of a system configured to forward data frames using a hierarchy of tiered virtual bridges that includes a distributed virtual bridge.

Referring to FIG. 4, another particular illustrative embodiment of a hierarchical tiered system configured to forward data frames is depicted. FIG. 4 generally shows a computer system 400 configured to forward data frames using a distributed virtual bridge 408. The distributed virtual bridge 408 may be similar to the third tier virtual bridge 324 of FIG. 3. The system 400 includes a first server computer 402, a second server computer 404, and an I/O blade device 406 that are coupled via the distributed virtual bridge 408. The server computers 402, 404 and the I/O blade device 406 may be housed within separate chassis and racks.

The distributed virtual bridge 408 may be coupled to multiple adapters 410, 412, 414, 416, 418, 420, 422, and 424. The adapters 410, 412, 414, 416, 418, 420, 422, and 424 may be located within or may be coupled to the server computers 402, 404. The distributed virtual bridge 408 may use multiple access points, or bridge elements 426, 428, 430, and 432-440 to couple to the server computers 402, 404. For example, a microchip that includes the bridge elements 426, 428, 430, and 432 may be cabled or otherwise coupled to a port of the server computer 402 that includes the adapter 410. As explained herein, the distributed virtual bridge 408 may functionally supplant chassis switches and top of rack switches with a frame-based network fabric that functions in a similar fashion to an Ethernet network.

One or more transport layer modules 482, 484, 486, and 488 coupled to the bridge elements 426, 428, 430, and 432 may provide a frame-based, Ethernet-like interface to one or more integrated switch routers 442. The transport layer module 482 may be configured to deconstruct a transmission of data frames so that packet information may be evenly distributed across links to the local rack interconnect 490. The data frames may not be serialized upon leaving the transport layer module 482. A receiving transport layer module 423 may serialize the data frames to achieve reliable, in-order delivery. If data frame information is determined to be missing by the receiving transport layer module 423, a process may be initiated by the transport layer module 423 to recover the missing data. The translation process may be accomplished in hardware, which may provide a larger bandwidth and faster processing than software applications. The transport layer modules 482, 484, 486, and 488, the integrated switch router 442, and a local rack interconnect network 490 may combine to include an underlying lossless, point-to-point communication network (i.e., an integrated switch router network) between the server computers 402, 404 and the 110 blade device 406.

The bridge elements 426, 428, 430, and 432 may function as data link layer (i.e., Layer 2) bridge forwarders within the distributed virtual bridge 408. The bridge elements 426, 428, 430, and 432 may include learned (e.g., received and stored) cached address data used to forward data frames throughout the distributed virtual bridge 408. The learned address data may correspond to one or both of a destination address and a source address associated with a data frame.

When the bridge element 426 does not include address data pertinent to a source or destination address of a received data frame, the bridge element 426 may query a controlling bridge 448 for the address data. The controlling bridge 448 may include a global forwarding table 411 that includes stored address data. The stored address data may be continuously updated by the bridge elements 426, 428, 430, and 432. For example, a bridge element 426 may send an update message to the controlling bridge 448 in response to learning an updated or new MAC address. A corresponding MAC address in the global forwarding table 411 may be subsequently updated.

Conversely, the address data of the global forwarding table 411 may be used to update the bridge elements 426, 428, 430, and 432. For example, the controlling bridge 448 may respond to a query from the bridge element 426 with requested address data. The bridge element 426 may cache the received address data for future use.

The first server computer 402 may comprise a blade server computer, such as the server computer 206 shown in FIG. 2. The first server computer 402 may include one or more virtual machines (VMs) 450, 452, 454, 456, 458, and 460. A virtual machine may include a software implementation of a computer and may execute programs in a manner similar to a physical machine.

FIG. 4 shows an illustrative hypervisor 462 that is coupled to both the virtual machine 450 and the virtual machine 452. The hypervisor 462 may include platform virtualization software that allows multiple operating systems to run concurrently on the first server computer 402. The hypervisor 462 may include a hypervisor virtual bridge 464 that allows direct communication between the virtual machines 450, 452 without traversal of an external network. The hypervisor virtual bridge 464 may be similar to the first tier virtual bridge 316 of FIG. 3. In one embodiment, the hypervisor virtual bridge 464 may register address information with the controlling bridge 448.

The server computer 402 may include at least one processor 403 coupled to a memory 405. The processor 403 may represent one or more processors (e.g., microprocessors), and the memory 405 may represent random access memory (RAM) devices comprising the main storage of the server computer 402, as well as supplemental levels of memory, e.g., cache memories, non-volatile or backup memories (e.g., programmable or flash memories), read-only memories, etc. In addition, the memory 405 may be considered to include memory storage physically located in the server computer 402 or on another server computer 404 coupled to the server computer 402 via the distributed virtual bridge 408.

The server computer 402 may operate under the control of an operating system (OS) 407 and may execute or otherwise rely upon various computer software applications, components, programs, objects, modules, and data structures, such as the virtual machines 450, 452, 454, 456, 458, and 460. Moreover, various applications, components, programs, objects, modules, etc. may also execute on one or more processors in another device coupled to the server computer 402 (e.g., in a distributed computing environment, where computing processes may be allocated to multiple server computer computers).

The first server computer 402 may include adapters 410, 412, 414, and 416, such as converged network adapters. A converged network adapter may include a single root I/O virtualization (SR-My) adapter, such as a Peripheral Component Interconnect Express (PCIe) adapter that supports Converged Enhanced Ethernet (CEE). The adapters 410, 412, 414, and 416 may be used to implement an FCoE protocol. Each adapter 410, 412, 414, and 416 may be coupled to one or more of the virtual machines 450, 452, 454, 456, 458, and 460. The adapters 410, 412, 414, and 416 may facilitate shared access of the virtual machines 450, 452, 454, 456, 458, and 460. While the adapters 410, 412, 414, and 416 are shown in FIG. 4 as being included within the server computer 402, adapters of another embodiment may include physically distinct devices that are separate from the server computers.

Each adapter 410, 412, 414, and 416 may include a converged adapter virtual bridge 466, 468, 470, and 472. The converged adapter virtual bridge 466 may be similar to the second tier virtual bridge 320 of FIG. 3. The converged adapter virtual bridges 466, 468, 470, and 472 may facilitate sharing of the adapters 410, 412, 414, and 416 by coordinating access by the virtual machines 450, 452, 454, 456, 458, and 460. Each converged adapter virtual bridge 466, 468, 470, and 472 may recognize data flows included within its domain. A recognized domain address may be routed directly, without processing or storage outside of the domain of the particular converged adapter virtual bridge 466, 468, 470, and 472. Each adapter 410, 412, 414, and 416 may include one or more CEE transmit ports that couple to one of the bridge elements 426, 428, 430, and 432. In another embodiment, the bridge elements may be co-located with the adapters, and the coupling between adapters and the bridge elements may not be Ethernet connections.

The bridge elements 426, 428, 430, and 432 may be configured to forward data frames throughout the distributed virtual bridge 408. The bridge elements 426, 428, 430, and 432 may thus function as access points for the distributed virtual bridge 408 by translating between Ethernet and the integrated switch router 442. The bridge elements 426, 428, 430, and 432 may not include buffers and may support CEE at boundaries of the distributed virtual bridge 408. In another embodiment, the bridge elements 426, 428, 430, and 432 may include buffers.

Each bridge element 426, 428, 430, and 432 of the distributed virtual bridge 408 may include a forwarding cache 474, 476, 478, and 480. A forwarding cache 474, 476, 478, and 480 may include a lookup table that comprises address data used to forward data frames that are received by the bridge elements 426, 428, 430, and 432. For example, the bridge element 426 may compare address data associated with a received data frame to the address data stored within the forwarding cache 474.

Illustrative address data may include routing information, such as a routing key that includes bytes of the header data of the data frame. The routing key may include at least one of a virtual local area network (VLAN) tag and a logical network identifier, as well as a MAC address. The MAC address may be generated and assigned by a Fiber Channel Forwarder (FCF) 413, as set by an administrator or computing system.

A VLAN tag may indicate an assigned VLAN, which may be used to segregate traffic and to allow more than one uplink. There may be multiple VLANs on an uplink. Conventionally, each VLAN may use only one uplink port. That is, only one physical, uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 408. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 474, 476, 478, and 480 of the distributed virtual bridge 408 may have a format similar to the global forwarding table 411 of the controlling bridge 448. The forwarding caches 474, 476, 478, and 480 may have smaller memory capacities than the global forwarding table 411. The forwarding caches 474, 476, 478, and 480 may further be updated with address data learned from data frames that flow through the bridge elements 426, 428, 430, and 432.

The address data may additionally be updated with address data received from the global forwarding table 411. Invalid or changed address data that is updated within one or more of the forwarding caches 474, 476, 478, and 480 of the bridge elements 426, 428, 430, and 432 may be communicated to the global forwarding table 411 of the controlling bridge 448. For example, the bridge element 426 may learn a new MAC address of a newly added device that is configured to receive from or send data to the distributed virtual bridge 408.

The bridge element 426 may verify that a source MAC address included within a received data frame is allowed at a port by checking a list stored within a memory. The bridge element 426 may send a registration message to the controlling bridge 448 to update the global forwarding table 411 with the verified MAC address. The bridge element 426 may further store the MAC address within the forwarding cache 474. In another example, the bridge element 426 may identify a MAC address that is not frequently used the forwarding cache 474. This MAC address may be removed from the forwarding cache 474 to make storage room available for other MAC addresses. The bridge element 426 may send an update message to the controlling bridge 448 to have the MAC address removed from the global forwarding table 411.

Address data stored within the global forwarding table 411 may be communicated to one or more forwarding caches 474, 476, 478, and 480 of the distributed virtual bridge 408. For example, the bridge element 426 may receive a data frame that includes a destination MAC address that is not stored within the forwarding cache 474. To obtain information for forwarding the data frame, the bridge element 426 may send a query to a bridge element 439 configured to access the controlling bridge 448. The bridge element 439 may search the global forwarding table 411 for address data associated with the destination MAC address. If found, the bridge element 439 may forward the MAC address through the distributed virtual bridge 408 to the querying bridge element 426. The bridge element 426 may store the MAC address as address data within the forwarding cache 474. As with the global forwarding table 411, the address data included within the forwarding caches 474, 476, 478, and 480 of the distributed virtual bridge 408 may include both internal address information, as well as addresses that are external to the system 400.

Each of the bridge elements 426, 428, 430, and 432 may be connected to one or more transport layer modules 482, 484, 486, and 488. The transport layer modules 482, 484, 486, and 488 may include buffering used for attachment to the integrated switch router 442. The transport layer modules 482, 484, 486, and 488 may further provide a frame-based, Ethernet-like interface to integrated switch router 442.

The transport layer modules 482, 484, 486, and 488 may each include a shared buffer used to transmit frames across the integrated switch router 442. Additional buffers of the transport layer modules 482, 484, 486, and 488 may be used to receive data frames from the integrated switch router 442. The buffers may be divided among different virtual lanes. Virtual lanes may include logically separated paths for data frame traffic flowing between a bridge element and a transport layer module. For example, there may be four virtual lanes between the bridge element 426 and the transport layer module 482. The transport layer modules 482, 484, 486, and 488 may include logic to recover from faulty microchips and links between a source and a destination. The transport layer modules 482, 484, 486, and 488 may maintain a strict ordering of packets within the same virtual lane regardless of each data frame's path through the local rack interconnect network 490 and the computer system 400.

The integrated switch router 442 may communicate with the transport layer modules 482, 484, 486, and 488 and may facilitate routing and packet delivery to and from the local rack interconnect network 490. The local rack interconnect network 490 may include links to the bridge elements 426, 428, 430, and 432 located within the same chassis and rack, as well as links to the bridge elements 433-440 in different chassis and racks. The local rack interconnect network 490 may include point-to-point connections, or pipes, between bridge elements 426, 428, 430, 432, and 433-440 of the distributed virtual bridge 408 with no loss and with in-order frame delivery.

The second server computer 404 may include a server computer similar to the first server computer 402 and may be similar to the server computer 216 of FIG. 2. As such, the second server computer 404 may be located within a different chassis and rack than the first server computer 402. Similar to the first server computer 402, the second server computer 404 may include a processor 499 coupled to a memory 497 and an operating system 495. The second server computer 404 may further include virtual machines 455, 457, 459, 461, 463, and 465.

A hypervisor 467 may be coupled to the virtual machines 457, 459. The hypervisor 467 may include a hypervisor virtual bridge 471 that allows direct communication between the virtual machines 457, 459. A hypervisor virtual bridge 473 of a hypervisor 469 coupled to the virtual machines 463, 465 may facilitate direct communication between the virtual machines 461, 463. For example, the hypervisor virtual bridges 471, 473 may register address data with the controlling bridge 448.

The second server computer 404 may also include one or more adapters 418, 420, 422, and 424, such as converged CEE network adapters. Each adapter 418, 420, 422, and 424 may be coupled to one or more of the virtual machines 455, 457, 459, 461, 463, and 465. The adapters 418, 420, 422, and 424 may each include a converged adapter virtual bridge 475, 477, 479, and 481. The converged adapter virtual bridges 475, 477, 479, and 481 may facilitate sharing of the adapters 418, 420, 422, and 424 by coordinating virtual machine access. The adapters 418, 420, 422, and 424 may each couple to one or more of the bridge elements 434, 436, 438, and 440 of the distributed virtual bridge 408. Each adapter 418, 420, 422, and 424 may include one or more CEE transmit ports that couple to one of the bridge elements 434, 436, 438, or 440.

Each bridge element 434, 436, 438, and 440 may include a forwarding cache 483, 485, 487, and 489 that includes address data used to forward data frames that are received by the bridge elements 434, 436, 438, and 440. The bridge elements 434, 436, 438, and 440 may each be connected to one or more transport layer modules 415, 417, 419, and 421. The transport layer modules 415, 417, 419, and 421 may include buffering used for the attachment to the integrated switch router 446. The transport layer modules 415, 417, 419, and 421 may further provide a frame-based, Ethernet-like interface to the integrated switch router 446 and may maintain packet ordering. A portion of the distributed virtual bridge 408 shown in FIG. 4 above the local rack interconnect network 490 as being associated with the first and second server computers 402, 404 may be referred to as a north portion. The bridge elements 426, 428, 430, 432, 434, 436, 438, and 440 may be coupled to the adapters 410, 412, 414, 416, 418, 420, 422, and 424.

The I/O blade device 406 may be the I/O server computer 258 of FIG. 2. As such, the I/O blade device 406 may allow uplink connectivity to the external Ethernet network 492 via an integrated switch router 442 that is coupled to the transport layer modules 423, 425, 427, 429, and 431.

The transport layer modules 423, 425, 427, 429, and 431 may each couple to a bridge element 433, 435, 437, and 439. The bridge elements 433, 435, 437, and 439 may each include a forwarding cache 441, 443, 445, and 447. The I/O blade device 406 may be categorized as being included within a south portion of the distributed virtual bridge 408 because the bridge elements 433, 435, 437, and 439 of the I/O blade device 406 may be coupled to an uplink to the Ethernet 492.

The I/O blade device 406 may include a memory 409, an operating system 491, and a processor 453 that includes the controlling bridge 448. The bridge element 439 may be coupled to the processor 453 via an Ethernet link connection 451. The transport layer module 431 may be coupled to a PCIe bus 444 that is coupled via a PCIe link connection 449 to the processor 453 and the controlling bridge 448. The PCIe bus 444 may also be coupled to a PCIe slot 493.

The controlling bridge 448 may communicate with the bridge elements 426, 428, 430, and 432-440 and other controlling bridges (not shown) of the computer system 400. The controlling bridge 448 may include firmware executing on the processor 453 that manages the bridge elements 426, 428, 430, and 432-440. For example, the controlling bridge 448 may be configured to divide a workload between the bridge elements 426, 428, 430, and 432-440, as well as perform synchronization procedures and failover operations.

The controlling bridge 448 may include the Fiber Channel Forwarder 413. FCoE may offer the capability to transport fiber channel payloads on top of an Ethernet network. The Fiber Channel Forwarder 413 may include firmware that encapsulates and de-encapsulates fiber channel data frames (e.g., FCoE formatted data frames). FCoE offers the capability to transport fiber channel payloads on top of an Ethernet network.

The controlling bridge 448 may additionally include the global forwarding table 411. The global forwarding table 411 may include address data (e.g., MAC addresses) that is registered and maintained through communication and cooperation with the bridge elements 426, 428, 430, and 432-440, and in some cases, the hypervisors 462, 467, and 469.

In one example, the global forwarding table 411 may maintain MAC addresses that have been learned by a bridge element 426. The bridge element 426 may register the address with the controlling bridge 448. The controlling bridge 448 may update the global forwarding table 411 by adding the address to the global forwarding table 411. Similarly, a bridge element 426 may cause the controlling bridge 448 to update the global forwarding table 411 by sending an update message to the controlling bridge 448. The update message may cause the controlling bridge 448 to delete a MAC address that has been aged out by a bridge element 426. A MAC address may further be deleted when the bridge element 426 has detected that the address data is no longer valid.

In another example, a hypervisor virtual bridge 464 may register MAC addresses or other address data with the controlling bridge 448. The global forwarding table 411 may include address data associated with addresses that are included within the system 400, as well as addresses that are external to the system 400.

FIG. 4 thus shows an embodiment of a system 400 that includes a hierarchy of tiered virtual bridges configured for lossless, point-to-point, in-order data frame delivery. The system 400 may support Fiber channel over Ethernet (FCoE) and may be scalable to include hundreds or more server computers. A data frame may be forwarded directly between computing nodes located within a common domain to reduce switch contention and configuration complexity.

Figure 5:
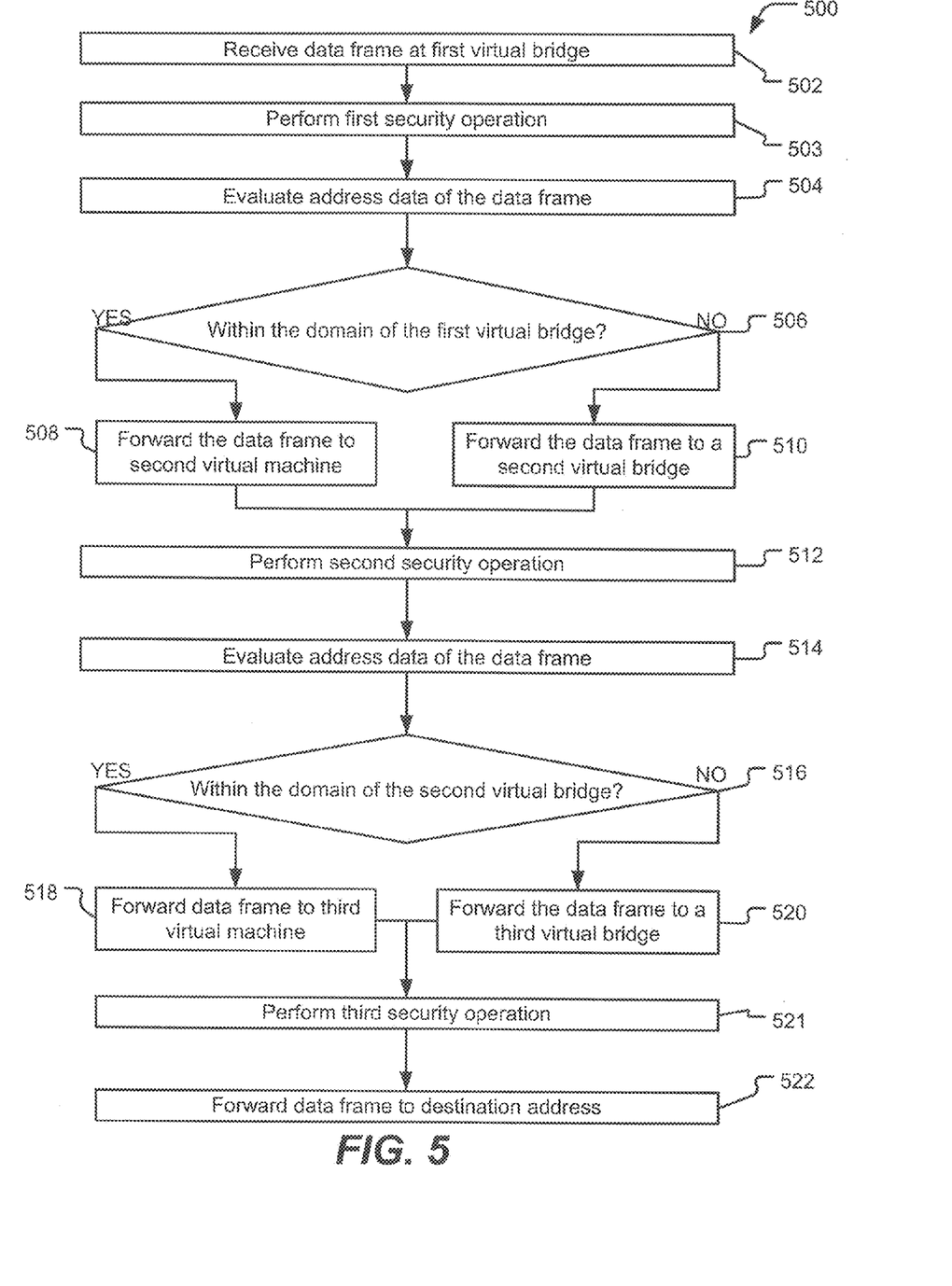
FIG. 5 is a flow diagram of a particular embodiment of a method to forward data frames through a hierarchical tiered virtual bridge system.

FIG. 5 is a flow diagram of an embodiment of a method of forwarding a data frame and is generally designated 500. In a particular embodiment, the method 500 is performed by the hierarchical tiered system 300 of FIG. 3.

At 502, a data frame may be received at a first virtual bridge. The first virtual bridge may be coupled to a first virtual machine. For example, an input port of the first tier virtual bridge 316 of FIG. 3 may receive a data frame from the virtual machine 312.

At 503, a first security operation(s) may be performed. Security operations may be strategically positioned within the hierarchy of virtual bridges to reduce redundancy. For example, a first tier virtual bridge 316 may verify that address data of a data frame received at a port of the first tier virtual bridge 316 is within a range of acceptable addresses.

The address data of the data frame may be evaluated, at 504. For instance, the first tier virtual bridge 316 of FIG. 3 may use the lookup table 318 to find a cache hit of stored address data that corresponds to a destination address of the data frame.

At 506, the first virtual bridge may determine if the destination address of the data frame is within a domain of the first virtual bridge. For example, the first tier virtual bridge 316 of FIG. 3 may determine if the data frame is addressed to a virtual machine 314 that is coupled to the first tier virtual bridge 316.

When the data frame is to be routed within the domain of the first virtual bridge, the first virtual bridge may forward the data frame between the first virtual machine and a second virtual machine associated with the first server computer and coupled to the first virtual bridge, at 508. For instance, the first tier virtual bridge 316 of FIG. 3 may forward the data frame to the virtual machine 314 that is coupled to the first tier virtual bridge 316. The data frame may be directly forwarded to the virtual machine 314 without first being routed through the lower tier 304 of the hierarchical tiered system 300.

When the first virtual bridge alternatively determines that the data frame should not be forwarded within the domain of the first virtual bridge, the first virtual bridge may forward the data frame to a second virtual bridge, at 510. The second virtual bridge may be associated with an adapter coupled to the first virtual machine. For example, the first tier virtual bridge 316 of FIG. 3 may forward the data frame to a port of the second tier virtual bridge 320.

At 512, a second security operation may be performed. The second security operation(s) may differ from the first security operation to reduce redundancy. For example, the security operation module 340 of FIG. 3 may be positioned at the second tier virtual bridge 320. The security operation module 340 may verify that the Ether type of a received frame is a predetermined type.

The address data of the data frame may be evaluated, at 514. For instance, the second tier virtual bridge 320 of FIG. 3 may use the lookup table 322 to find a cache hit of stored address data that corresponds to a destination address of the data frame.

At 516, the second virtual bridge may determine if the destination address of the data frame is within a domain of the second virtual bridge. For example, the second tier virtual bridge 320 of FIG. 3 may determine if the data frame should be forwarded to a virtual machine 310 that is coupled to the second tier virtual bridge 320.

When the data frame is to be routed within the domain of the second virtual bridge, the second virtual bridge may forward the data frame between the first virtual bridge and a third virtual machine that is associated with the first server computer and coupled to the second virtual bridge, at 518. For instance, the second tier virtual bridge 320 of FIG. 3 may forward the data frame to the virtual machine 310 that is coupled to the second tier virtual bridge 320. The data frame may be directly forwarded from the first virtual bridge 316 to the virtual machine 310 without first being routed through a lower tier 306 of the hierarchical tiered system 300.

When the second virtual bridge alternatively determines that the data frame should not be forwarded within the domain of the second virtual bridge, the second virtual bridge may forward the data frame to a third virtual bridge, at 520. For instance, the second tier virtual bridge 320 of FIG. 3 may forward the data frame to the third tier virtual bridge 324 upon determining that the data frame is not addressed to a computing component within the domain of the second tier virtual bridge 320.

At 521, a third security operation may be performed. The third security operation(s) may differ from the first and second security operations to reduce redundancy.

At 522, the third virtual bridge may forward the data frame according to the destination address. The virtual bridge may be configured to forward the data frame based upon the address data to a second server computer of the plurality of server computers. For example, the third tier virtual bridge 324 of FIG. 3 may forward the data frame to the virtual machine 350.

FIG. 5 thus shows a method 500 that facilitates lossless, point-to-point, in-order frame delivery of a data frame between layers of a hierarchical tiered system. Functions, such as those storing address data and performing security operations, may be distributed throughout to decrease redundancy and increase efficiency. Costs and space demands may be reduced, and an embodiment of a system may be scalable to include hundreds or more server computers with direct connectivity.

Particular embodiments can take the form of an entirely hardware embodiment, an entirely software embodiment, or an embodiment containing both hardware and software elements. Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Examples of optical disks include compact disc—read only memory (CD-ROM), compact disc—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, methods, and illustrative examples shown and described. Accordingly, departures may be made from such details without departing from the scope of Applicants' general inventive concept.

The invention claimed is:

1. An apparatus comprising:
    a first virtual bridge associated with a first domain and coupled to a first virtual machine of a first server computer of a plurality of server computers, wherein the first virtual bridge is configured to forward a first data frame to a second virtual bridge responsive to address data of the first data frame indicating that a destination of the first data frame is outside of the first domain of the first virtual bridge;
    the second virtual bridge associated with a second domain and associated with an adapter coupled to the first virtual machine, wherein the second virtual bridge is configured to receive the first data frame from the first virtual bridge and forward the first data frame to a third virtual bridge responsive to the address data of the first data frame indicating that the destination of the data frame is outside of the second domain of the second virtual bridge; and
    the third virtual bridge associated with a third domain, coupled to the adapter, and coupled to the plurality of server computers, the third virtual bridge configured to receive the first data frame from the second virtual bridge and to forward the first data frame within the third domain to a second server computer of the plurality of server computers.

2. The apparatus of claim 1, wherein the third virtual bridge is a distributed virtual bridge that further comprises a plurality of bridge elements coupled to the plurality of server computers.

3. The apparatus of claim 1, wherein the first virtual bridge is configured to forward a second data frame between the first virtual machine and a second virtual machine associated with the first server computer.

4. The apparatus of claim 1, wherein the first virtual bridge is configured to evaluate the address data of the first data frame to determine where to forward the first data frame, wherein the address data is included within the first data frame.

5. The apparatus of claim 1, wherein the first virtual bridge includes a lookup table to evaluate the address data of the first data frame.

6. The apparatus of claim 1, wherein the first virtual bridge is included within a hypervisor of the first server computer.

7. The apparatus of claim 1, wherein the second virtual bridge is configured to forward a second data frame between the first virtual bridge and a second virtual machine associated with the first server computer.

8. The apparatus of claim 1, wherein the second virtual bridge is configured to forward a second data frame between the first virtual machine and a second virtual machine associated with the first server computer.

9. The apparatus of claim 1, wherein the second virtual bridge is configured to evaluate the address data of the first data frame to determine whether to forward the first data frame, wherein the address data is included within the first data frame.

10. The apparatus of claim 1, wherein the second virtual bridge includes a lookup table to evaluate the address data, wherein the address data is included within the first data frame.

11. The apparatus of claim 1, wherein the adapter includes a converged network adapter.

12. The apparatus of claim 1, wherein the third virtual bridge includes a forwarding cache.

13. The apparatus of claim 1, wherein the plurality of server computers are housed within at least one of separate server racks and separate server chassis.

14. The apparatus of claim 1, wherein at least one of the first virtual bridge, the second virtual bridge, and the third virtual bridge is configured to perform a security operation on the first data frame.

15. An apparatus comprising:
    a first tier virtual bridge associated with a first domain and coupled to a first plurality of computing nodes within the first domain, wherein the first tier virtual bridge stores first address data to forward a first data frame between the first plurality of computing nodes of the first domain;
    a second tier virtual bridge associated with a second domain, coupled to the first tier virtual bridge, and coupled to a second plurality of computing nodes within the second domain, wherein the second tier virtual bridge stores second address data to forward a second data frame between the second plurality of computing nodes of the second domain; and
    a third tier virtual bridge associated with a third domain, coupled to the second virtual bridge, and coupled to a third plurality of computing nodes within the third domain, wherein the third tier virtual bridge stores third address data to forward a third data frame between the third plurality of computing nodes of the third domain; and
    a tier supervisor module including an interface configured to set an operating parameter of at least two of: the first tier virtual bridge, the second tier virtual bridge, and the third tier virtual bridge.

16. The apparatus of claim 15, wherein the first tier virtual bridge is configured to forward the second data frame to the second tier virtual bridge in response to determining that a destination address of the second data frame does not correspond to the first plurality of computing nodes of the first domain.

17. The apparatus of claim 15, wherein the second tier virtual bridge is configured to forward the third data frame to the third tier virtual bridge in response to determining that a destination address of the third data frame does not correspond to the second plurality of computing nodes of the second domain.

18. The apparatus of claim 15, wherein the second tier virtual bridge does not include the first address data.

19. A method of forwarding a data frame, the method comprising:

evaluating address data of a first data frame at a first virtual bridge associated with a first domain and coupled to a first virtual machine of a first server computer of a plurality of server computers, wherein evaluating the address data includes determining whether the address data indicates a destination of the first data frame that is within the first domain of the first virtual bridge;

based upon the evaluation at the first virtual bridge, forwarding the first data frame to a second virtual bridge associated with a second domain and associated with an adapter coupled to the first virtual machine;

evaluating the address data of the first data frame at the second virtual bridge, wherein evaluating the address data includes determining whether the address data indicates that the destination of the first data frame is within the second domain of the second virtual bridge; and based upon the evaluation at the second virtual bridge, forwarding the first data frame to a third virtual bridge associated with a third domain and configured to forward the data frame within the third domain based upon the address data to a second server computer of the plurality of server computers.

20. The method of claim 19, wherein the evaluation at one of the first and second virtual bridges includes using the address data in a table lookup operation.

21. The method of claim 19, wherein the evaluation at one of the first and second virtual bridges includes performing a security operation.

22. The method of claim 19, further comprising at the first virtual bridge, forwarding a second data frame between the first virtual machine and a second virtual machine associated with the first server computer.

23. The method of claim 19, further comprising at the second virtual bridge, forwarding a second data frame between the first virtual machine and a second virtual machine associated with the first server computer.

24. The method of claim 19, wherein the evaluation at the third virtual bridge includes using a forwarding cache to route the first data frame according to the address data.

25. A program product, comprising:

program code resident within a memory and configured to be executed by a processor to forward a data frame by evaluating address data of a first data frame at a first virtual bridge associated with a first domain and coupled to a first virtual machine of a first server computer of a plurality of server computers, wherein evaluating the address data includes determining whether the address data indicates a destination of the first data frame that is within the first domain of the first virtual bridge, and based upon the evaluation at the first virtual bridge, to forward the first data frame to a second virtual bridge associated with a second domain and associated with an adapter coupled to the first virtual machine, wherein the program code is further executable by the processor to evaluate the address data of the first data frame at the second virtual bridge, wherein evaluating the address data includes determining whether the address data indicates that the destination of the first data frame is within the second domain of the second virtual bridge, and based upon the evaluation at the second virtual bridge, to forward the first data frame to a third virtual bridge, wherein the third virtual bridge is associated with a third domain and configured to forward the data frame within the third domain based upon the address data to a second server computer of the plurality of server computers; and a non-transitory computer readable medium bearing the program code.

* * * * *